United States Patent
Kim et al.

(10) Patent No.: US 10,752,509 B2
(45) Date of Patent: Aug. 25, 2020

(54) METHOD OF PREPARING METAL OXIDE-SILICA COMPOSITE AEROGEL AND METAL OXIDE-SILICA COMPOSITE AEROGEL PREPARED BY USING THE SAME

(71) Applicant: LG CHEM, LTD., Seoul (KR)

(72) Inventors: Jong Hun Kim, Daejeon (KR); Je Kyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 114 days.

(21) Appl. No.: 15/577,747

(22) PCT Filed: Jun. 1, 2016

(86) PCT No.: PCT/KR2016/005816
§ 371 (c)(1),
(2) Date: Nov. 28, 2017

(87) PCT Pub. No.: WO2016/195381
PCT Pub. Date: Dec. 8, 2016

(65) Prior Publication Data
US 2018/0127278 A1 May 10, 2018

(30) Foreign Application Priority Data
Jun. 1, 2015 (KR) .................. 10-2015-0077279
Jun. 1, 2016 (KR) .................. 10-2016-0067870

(51) Int. Cl.
| | |
|---|---|
| *C01B 33/158* | (2006.01) |
| *B01J 20/10* | (2006.01) |
| *B01J 20/28* | (2006.01) |
| *B01J 20/06* | (2006.01) |
| *C01B 33/021* | (2006.01) |

(52) U.S. Cl.
CPC .......... *C01B 33/1585* (2013.01); *B01J 20/06* (2013.01); *B01J 20/10* (2013.01); *B01J 20/103* (2013.01); *B01J 20/28011* (2013.01); *B01J 20/28057* (2013.01); *B01J 20/28069* (2013.01); *B01J 20/28085* (2013.01); *C01B 33/021* (2013.01); *C01P 2006/11* (2013.01); *C01P 2006/12* (2013.01)

(58) Field of Classification Search
CPC . C01B 33/1585; C01B 13/185; C01B 13/363; B01J 13/0091; B01J 19/12; B01J 20/06; B01J 20/10; B01J 20/103; B01J 20/28011; B01J 20/28057; B01J 20/28069; B01J 20/28085
See application file for complete search history.

(56) References Cited

U.S. PATENT DOCUMENTS

| | | | |
|---|---|---|---|
| 2,241,791 A | 5/1941 | Rembert | |
| 2,434,418 A | 1/1948 | La Lande, Jr. | |
| 3,473,890 A | 10/1969 | Reinhardt et al. | |
| 3,977,993 A * | 8/1976 | Lynch | B01J 13/0091 423/338 |
| 4,367,292 A | 1/1983 | Sano et al. | |
| 5,811,031 A | 9/1998 | Jansen et al. | |
| 5,851,947 A | 12/1998 | Hair et al. | |
| 5,948,482 A * | 9/1999 | Brinker | C01B 13/145 106/287.12 |
| 6,315,971 B1 | 11/2001 | Wallace et al. | |
| 7,736,611 B2 | 6/2010 | Norberg et al. | |
| 9,199,853 B2 | 12/2015 | Tomimatsu et al. | |
| 10,399,857 B2 | 9/2019 | Jeon et al. | |
| 10,556,800 B2 | 2/2020 | Kim et al. | |
| 2001/0034375 A1 | 10/2001 | Schwertfeger et al. | |
| 2008/0034968 A1 | 2/2008 | Nordberg et al. | |
| 2011/0000370 A1* | 1/2011 | Norberg | B01D 53/62 95/90 |
| 2013/0106008 A1 | 5/2013 | Ahn et al. | |
| 2014/0057111 A1 | 2/2014 | Fujimoto et al. | |
| 2018/0127277 A1 | 5/2018 | Kim et al. | |
| 2018/0127278 A1 | 5/2018 | Kim et al. | |

(Continued)

FOREIGN PATENT DOCUMENTS

| | | |
|---|---|---|
| CN | 101132856 | 2/2008 |
| CN | 103476707 | 12/2013 |
| CN | 104495859 | 4/2015 |

(Continued)

OTHER PUBLICATIONS

Extended Search Report of European Patent Office in Appl'n. No. 16803735.6, dated Apr. 25, 2018.
Extended Search Report of European Patent Office in Appl'n. No. 16803734.9, dated May 4, 2018.
Extended Search Report of European Patent Office in Appl'n. No. 16803736.4, dated May 9, 2018.
Office Action of the Korean Patent Office in Appl'n. No. 10-2016-0067870, dated May 11, 2018.
U.S. Appl. No. 15/577,750.
U.S. Appl. No. 15/577,742.

(Continued)

*Primary Examiner* — Anthony J Zimmer
*Assistant Examiner* — Ricardo D Morales
(74) *Attorney, Agent, or Firm* — Dentons US LLP

(57) ABSTRACT

Provided are a method of preparing a metal oxide-silica composite aerogel, which includes preparing metal oxide-silica composite precipitates by adding a metal salt solution to a silicate solution and performing a reaction, and washing the metal oxide-silica composite precipitates with a washing solvent having a surface tension at 20±5° C. of 30 mN/m or less and drying the washed metal oxide-silica composite precipitates, and a metal oxide-silica composite aerogel having increased specific surface area and pore properties as well as tap density, which is significantly reduced by a maximum of 78.6% in comparison to a composite aerogel prepared by using water as a typical washing solvent, prepared by the method.

15 Claims, No Drawings

(56) References Cited

U.S. PATENT DOCUMENTS

2018/0127279 A1 5/2018 Kim et al.

FOREIGN PATENT DOCUMENTS

| EP | 3305725 | 4/2018 |
|---|---|---|
| EP | 3305726 | 4/2018 |
| EP | 3305727 | 4/2018 |
| JP | H0264007 | 3/1990 |
| JP | H11139819 | 5/1999 |
| JP | 2000034117 | 2/2000 |
| JP | 2012172378 | 9/2012 |
| JP | 2014051643 | 3/2014 |
| KR | 10-0785521 | 12/2007 |
| KR | 10-2009-0115714 | 11/2009 |
| KR | 10-2010-0065692 | 6/2010 |
| KR | 10-2010-0090989 | 8/2010 |
| KR | 10-2011-0046715 | 5/2011 |
| KR | 10-1323303 | 10/2013 |
| KR | 10-2014-0005177 | 1/2014 |
| KR | 10-2014-0076022 | 6/2014 |
| KR | 10-2014-0146814 | 12/2014 |
| WO | 1998045032 | 10/1998 |
| WO | 2013118940 | 8/2013 |

OTHER PUBLICATIONS

Office Action of European Patent Office in Appl'n No. 16803734.9 dated May 20, 2019.
Giesche, "Mercury Porosimetry: A General (Practical) Overview," Part. Part. Syst. Charact. 23: 9-19 (2006).

* cited by examiner

METHOD OF PREPARING METAL OXIDE-SILICA COMPOSITE AEROGEL AND METAL OXIDE-SILICA COMPOSITE AEROGEL PREPARED BY USING THE SAME

CROSS-REFERENCE TO RELATED APPLICATIONS

This application is a National Stage Application of International Application No. PCT/KR2016/005816 filed on Jun. 1, 2016, which claims priority to and the benefit of Korean Patent Application Nos. 2015-0077279, filed on Jun. 1, 2015, and 2016-0067870, filed on Jun. 1, 2016, all of which are incorporated herein in their entirety by reference for all purposes as if fully set forth herein.

TECHNICAL FIELD

The present invention relates to a method of preparing a metal oxide-silica composite aerogel having low tap density, high specific surface area and pore volume, and low thermal conductivity by minimizing a shrinkage phenomenon occurring in a drying process during the preparation of the metal oxide-silica composite aerogel, and a metal oxide-silica composite aerogel prepared by using the same.

BACKGROUND ART

Recently, interests in an aerogel having excellent heat insulation properties have grown as industrial technologies are modernized. Aerogels developed to date may include an organic aerogel, such as resorcinol-formaldehyde or melamine-formaldehyde aerogel particles, and an inorganic aerogel including metal oxide such as a silica ($SiO_2$), alumina ($Al_2O_3$), titania ($TiO_2$), or carbon (C) aerogel.

Among these aerogels, the silica aerogel is a highly porous material, wherein, since the silica aerogel may exhibit an excellent heat insulation effect by having high porosity and specific surface area as well as low thermal conductivity, applications in various areas, such as heat insulation materials, catalysts, sound-absorbing materials, fillers, and interlayer dielectric materials of a semiconductor circuit, are expected.

Since the silica aerogel has low mechanical strength due to its porous structure, the silica aerogel is normally commercialized in a form, such as an aerogel blanket or aerogel sheet, by compositing with a base material such as glass fibers, ceramic fibers, or polymer fibers. However, since the silica aerogel structurally contains 90 vol % or more of air in an internal pore, the silica aerogel has limitations in that scattering is severe during processing due to excessively low density and it is difficult to impregnate the silica aerogel into the base material. Also, since the silica aerogel is not mixed well due to an excessively large difference in density with respect to the base material even if a portion of the silica aerogel is impregnated, limitations, such as appearance defects and physical property deterioration, may occur. Furthermore, the silica aerogel must be mixed in a volume fraction of 5 vol % or more to achieve the heat insulation effect due to filling by efficiently blocking heat transfer, but it is not easy to process the powder itself at such a high mixing ratio.

Accordingly, in order to improve the properties of the aerogel, such as heat insulation, sound absorption, and catalytic activity, as well as processability of the silica aerogel or provide additionally required properties, a method of mixing an additive with the aerogel has been proposed. Specifically, a method of strengthening a structure and increasing density by introducing elements heavier than silicon (Si), such as titanium (Ti) and iron (Fe), into a silica aerogel skeleton by a method of adding the additive to a sol before polymerization of the silica aerogel or contacting the prepared silica aerogel with a liquid or vapor stream containing the additive, or a method of forming a composite with an inorganic material having a plate structure has been proposed.

However, convention methods have limitations in that control of size and particle size distribution of the additive materials is not easy, and deformation and reduction of the pore structure occur during the preparation of the silica aerogel.

DISCLOSURE OF THE INVENTION

Technical Problem

An aspect of the present invention provides a preparation method which may easily prepare a metal oxide-silica composite aerogel having low tap density and high specific surface area as well as excellent pore properties by minimizing a shrinkage phenomenon of a silica gel which occurs in a drying process during the preparation of the metal oxide-silica composite aerogel.

Another aspect of the present invention provides a metal oxide-silica composite aerogel prepared by the above preparation method.

Technical Solution

According to an aspect of the present invention, there is provided a method of preparing a metal oxide-silica composite aerogel including: preparing metal oxide-silica composite precipitates by adding a metal salt solution to a silicate solution and performing a reaction; and washing the metal oxide-silica composite precipitates with a washing solvent having a surface tension at 20±5° C. of 30 mN/m or less, and drying the washed metal oxide-silica composite precipitates.

According to another aspect of the present invention, there is provided a metal oxide-silica composite aerogel prepared by the method.

Advantageous Effects

A method of preparing a metal oxide-silica composite aerogel according to the present invention may minimize a shrinkage phenomenon of an aerogel, which occurs in a drying process, by using a washing solvent having a low surface tension during washing of metal oxide-silica composite precipitates. As a result, a metal oxide-silica composite aerogel having excellent physical properties, such as low tap density and high specific surface area, as well as excellent pore properties may be prepared. Accordingly, the metal oxide-silica composite aerogel prepared by the above preparation method may be used in various industrial areas, for example, catalysts or heat insulation materials, due to the above-described pore and physical properties.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

During the preparation of a typical metal oxide-silica composite aerogel, a washing process for particles of the composite aerogel is an essential process to remove unreacted reactants (e.g., $Si^{4+}$, $Mg^{2+}$, or $Ca^{2+}$) and added ions ($Na^+$, $Cl^-$) in a solution. However, since deionized water mainly used as a washing solvent has a high surface tension (71.97 mN/m), capillary action is strong in pores in the composite aerogel particles during a subsequent drying process to cause a shrinkage phenomenon, and, as a result, tap density of the composite aerogel is increased, and specific surface area and pore volume are reduced.

In contrast, in the present invention, the shrinkage phenomenon of the aerogel occurring in the drying process may be minimized by using a washing solvent which has a low surface tension and easily penetrates into the pores in the silica gel particles due to excellent miscibility with an aqueous liquid phase, as a reaction solvent, at the same time, and, as a result, a metal oxide-silica composite aerogel having improved tap density may be prepared.

That is, a method of preparing a metal oxide-silica composite aerogel (hereinafter, simply referred to as 'composite aerogel') according to an embodiment of the present invention includes the steps of: preparing metal oxide-silica composite precipitates by adding a metal salt solution to a silicate solution and performing a reaction (step 1); and, after washing the metal oxide-silica composite precipitates with a washing solvent having a surface tension at 20±5° C. of 30 mN/m or less, drying the washed metal oxide-silica composite precipitates (step 2). Hereinafter, each step will be described in more detail.

Step 1

In the method of preparing a composite aerogel according to the embodiment of the present invention, step 1 is a step of forming metal oxide-silica composite precipitates by adding a metal salt solution to a silicate solution and performing a reaction.

Specifically, after adding and mixing the metal salt solution having a metal ion concentration of 0.125 M to 3.0 M to the silicate solution, the metal oxide-silica composite precipitates may be formed by selectively adjusting a pH of the resulting mixture to be in a range of 1.5 to 10.

The silicate solution may be prepared by dissolving water glass ($Na_2SiO_3$) in a solvent, particularly water, at a concentration of 0.125 M to 3.0 M. If the concentration of the water glass is less than 0.125 M, an amount of silica in the finally prepared composite aerogel is low, and, if the concentration of the water glass is greater than 3.0 M, tap density may be increased due to the excessive formation of the composite aerogel. In consideration of a tap density reduction effect, the silicate solution may particularly include the water glass at a concentration of 0.75 M to 3.0 M and may more particularly include the water glass at a concentration of 1.5 M to 2.0 M. In this case, the water glass is not particularly limited, but the water glass may contain silica ($SiO_2$) in an amount of 28 wt % to 35 wt %, for example, 28 wt % to 30 wt %, based on a total weight of the water glass.

Also, the silicate solution may include the water glass ($Na_2SiO_3$) in an amount such that 0.04 M to 6.0 M of silica is included based on the silica ($SiO_2$) included in the water glass.

Furthermore, the metal salt solution is prepared by dissolving a metal salt, as a raw material to allow a metal oxide to be formed in the finally prepared composite aerogel, in a solvent. The metal salt may particularly be a salt including at least one metal selected from the group consisting of alkali metals, alkaline earth metals, lanthanides, actinides, transition metals, and Group 13 (IIIA) metals, may more particularly be chloride including the above-described metal, and, for example, may be chloride including at least one metallic element selected from the group consisting of calcium (Ca), magnesium (Mg), copper (Cu), zinc (Zn), manganese (Mn), cadmium (Cd), lead (Pb), nickel (Ni), chromium (Cr), silver (Ag), titanium (Ti), vanadium (V), cobalt (Co), molybdenum (Mo), tin (Sn), antimony (Sb), strontium (Sr), barium (Ba), and tungsten (W). Also, among the above-described metals, the metal may be appropriately selected depending on the application of the composite aerogel, for example, the metal salt may be chloride including magnesium, calcium, or a mixed metal thereof in consideration of applications requiring thermal insulation.

Also, in a case in which the metal salt includes two kinds of metal salts, it is desirable to add the two kinds of metal salts by adjusting a ratio of concentrations of each metal ion so as to satisfy a ratio of metallic elements in a metal oxide in the finally prepared composite aerogel. For example, with respect to a composite aerogel required to have an excellent thermal insulation performance, the composite aerogel may include MgO and CaO as the metal oxide, and, in this case, the MgO and the CaO may be included at a molar ratio of 1:2 to 2:1.

Furthermore, the metal salt may be used in an amount such that a concentration of metal ions derived from the metal salt in the metal salt solution is in a range of 0.125 M to 3.0 M. If the concentration of the metal ions is less than 0.125 M, since an amount of the metal oxide formed in the composite aerogel is small, an improvement effect due to the formation of the metal oxide is insignificant, and, if the concentration of the metal ions is greater than 3.0 M, physical properties including tap density of the composite aerogel may be deteriorated due to the formation of an excessive amount of the metal oxide. Specifically, the metal salt may be used in an amount such that the concentration of the metal ions in the metal salt solution is in a range of 0.25 M to 1.0 M, for example, 0.25 M to 0.5 M.

Furthermore, comparing with the concentration of the water glass in the silicate solution within the above-described concentration range, the metal salt may be used in an amount such that a molar ratio of water glass:metal ions is in a range of 1:1 to 3:1. If the concentration of the metal salt is outside the above molar ratio range, the tap density of the finally prepared composite aerogel may be increased. Specifically, the metal salt may be used in an amount such that the molar ratio of water glass:metal ions is in a range of 1.5:1 to 3:1, for example, 3:1.

Also, the solvent used for the formation of the metal salt solution may be used without particular limitation as long as it may dissolve the above-described metal salt. Specifically, the solvent may include water or a hydrophilic polar organic solvent, and any one thereof or a mixture of two or more thereof may be used. Among these, since the hydrophilic polar organic solvent has excellent miscibility with the above-described silicate solution, the hydrophilic polar organic solvent may be uniformly present in a gel during the subsequent gelation.

The hydrophilic polar organic solvent may specifically be an alcohol-based solvent. Also, the alcohol-based solvent may specifically be a monovalent alcohol such as methanol, ethanol, isopropanol, and butanol; or a polyvalent alcohol such as glycerol, ethylene glycol, propylene glycol, diethylene glycol, dipropylene glycol, and sorbitol, and any one thereof or a mixture of two or more thereof may be used. Among these alcohols, the alcohol-based solvent may be an alcohol having 1 to 8 carbon atoms in consideration of miscibility with water and uniform dispersibility in the silica gel. Also, in consideration of the efficiency of the subsequent modification reaction on the surface of the silica in addition to the above-described effect, the alcohol-based solvent may be a linear alcohol having 1 to 4 carbon atoms, such as methanol, ethanol, propanol, or n-butanol, and one alone or a mixture of two or more thereof may be used. For example, the alcohol-based solvent may be methanol, ethanol, or a mixture thereof.

The adding and mixing of the metal salt solution to the silicate solution may be performed according to a typical method.

Thereafter, the method may further include a step of adjusting a pH of a mixture obtained as a result of the mixing process to be in a range of 1.5 to 10, for example, 3 to 9.5. In this case, if the pH of the mixture is outside the above range, the tap density of the finally prepared composite aerogel may be increased and the specific surface area and pore properties may be reduced.

The pH of the mixed liquid may be adjusted by controlling the mixing ratio of the silicate to the metal salt, or may be controlled by selectively further adding an acid catalyst.

The acid catalyst plays a role in increasing a formation rate of the composite precipitates by promoting the reaction of the silicate solution with the metal salt solution during the formation of the composite precipitates. The acid catalyst may specifically include hydrochloric acid, acetic acid, citric acid, sulfuric acid, phosphoric acid, or nitric acid, and any one thereof or a mixture of two or more thereof may be used. Among these acids, the acid catalyst may be an inorganic acid such as hydrochloric acid.

In order to achieve an improvement effect having good balance of the tap density and the specific surface area and pore properties due to the pH adjustment, the pH of the mixed liquid may be adjusted to be in a range of 3 to 9 by the addition of the acid catalyst, and, in consideration of a significant improvement effect, the pH, for example, may be adjusted to be in a range of 5 or more to less than 7 which indicates a weak acidic condition.

When the pH is adjusted to be in a range of 1.5 to 10 by adding the acid catalyst to the mixture of the silicate solution and the metal salt solution, metal oxide-silica composite precipitates are formed and precipitated. For example, in a case in which $MgCl_2$ and $CaCl_2$ are used as the metal salt, $MgO$—$CaO$—$SiO_2$ composite precipitates are precipitated by a reaction of the following Reaction Formula 1.

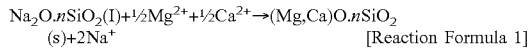
[Reaction Formula 1]

After the formation of the metal oxide-silica composite precipitates, a separation process, in which the precipitates are separated from the solvent by a typical method, for example, using a vacuum filter, may be selectively further performed. In this case, the method of preparing a composite aerogel according to the embodiment of the present invention may further include the separation process from the solvent, after the formation of the metal oxide-silica composite precipitates.

Step 2

In the method of preparing a composite aerogel according to the embodiment of the present invention, step 2 is a step of washing and drying the metal oxide-silica composite precipitates formed in step 1 to prepare a composite aerogel.

The washing process is to remove unreacted reactants (e.g., $Si^{4+}$, $Mg^{2+}$, or $Ca^{2+}$) and added ions ($Na^+$ or $Cl^-$) remaining in the precipitates, wherein it is desirable to perform the washing process using a washing solvent which easily penetrates into the pores in the silica gel particles due to excellent miscibility with an aqueous liquid phase as a reaction solvent during the washing process and simultaneously has a low surface tension so as to prevent shrinkage and deformation of a pore structure in the silica gel during the subsequent drying process. Specifically, the washing solvent may have a surface tension at 20±5° C. of 30 mN/m or less, for example, 0.1 mN/m to 25 mN/m.

Specifically, an alcohol-based compound, a hydrocarbon-based compound, or a ketone-based compound satisfying the above-described surface tension condition may be used as the washing solvent. For example, the washing solvent may include the alcohol-based compound such as methanol, ethanol, isopropanol, or propanol; the hydrocarbon-based compound such as hexane, octane, n-decane, n-heptane, n-undodecane, cyclohexane, or toluene; or the ketone-based compound such as methylethylketone or acetone, and any one thereof or a mixture of two or more thereof may be used.

Also, a mixture of water and the above-described compound may be used as the washing solvent by adjusting a mixing ratio so as to satisfy the above-described surface tension condition.

Among the above compounds, the alcohol-based compound, in which it has excellent miscibility with water as the reaction solvent, it easily penetrates into the pores in the silica gel particles, it has a drying effect when combined with the subsequent drying process, and the resulting shrinkage and deformation of the pores may hardly occur, for example, ethanol may be used.

The washing process may be performed according to a typical washing method and may be repeated once or twice or more, specifically, 3 to 5 times. Also, in a case in which the washing process is repeated twice or more, the washing process may be performed by using the same washing solvent or may be performed by using different kinds of washing solvents. Specifically, after primary washing using ethanol, a secondary washing process using a washing solvent, which includes one selected from the group consisting of methanol, tetrahydrofuran, toluene, and hexane, or a mixture of two or more thereof, may be performed.

A drying process is performed after the above-described washing process.

The drying process may be performed by a method such as a heat treatment or hot air injection. Also, a specific temperature condition during the drying process may be appropriately adjusted depending on the washing solvent, and, specifically, the drying process may be performed in a temperature range of 90° C. to 200° C.

Also, before the drying process and after the washing process of the metal oxide-silica composite precipitates, a water content control process through solid/liquid separation may be performed.

The water content control process may be performed by a typical solid/liquid separation method, for example, using a vacuum filter, and may specifically be performed so that a water content in the metal oxide-silica composite precipitates is 110 wt % or less, for example, 85 wt % or less based on a total weight of the metal oxide-silica composite precipitates. Drying time during the drying process may be reduced and processability may be simultaneously increased through the control of the water content.

Furthermore, the method of preparing a metal oxide-silica composite aerogel according to the embodiment of the present invention may be performed by combining and optimizing the surface tension and hydrophilicity of the washing solvent and drying process conditions for a good balanced improvement of improved physical properties, low tap density, and high Brunauer-Emmett-Teller (BET) specific surface area and pore volume of the finally prepared metal oxide-silica composite aerogel. Specifically, the method of preparing a metal oxide-silica composite aerogel includes the steps of: preparing metal oxide-silica composite precipitates by adding a metal salt solution and an acid catalyst to a silicate solution and performing a reaction in a pH range of 3 to 9, for example, 5 or more to less than 7; and washing the metal oxide-silica composite precipitates with a hydrophilic washing solvent having a surface tension at 20±5° C. of 0.1 mN/m to 25 mN/m, and drying the washed metal oxide-silica composite precipitates in a temperature range of 90° C. to 200° C.

Also, the method of preparing a metal oxide-silica composite aerogel according to the embodiment of the present invention may be performed by combining and optimizing the concentration of the water glass in the silicate solution, the concentration of the metal ions, the pH range of the mixture, the molar ratio of the water glass to the metal ions, and the molar ratio of magnesium ions to calcium ions in the metal salt, in addition to the optimization of the above-described washing solvent and drying process conditions, for a good balanced improvement of improved physical properties, low tap density, and high BET specific surface area and pore volume of the finally prepared metal oxide-silica composite aerogel. Specifically, the method of preparing a metal oxide-silica composite aerogel includes the steps of: preparing metal oxide-silica composite precipitates by adding a metal salt solution having a metal ion concentration of 0.125 M to 3.0 M to a silicate solution including 0.125 M to 3.0 M of water glass ($Na_2SiO_3$), adding an acid catalyst to a resulting mixture such that a pH of the mixture becomes in a range of 3 to 9, for example, 5 or more to less than 7, and performing a reaction; and washing the metal oxide-silica composite precipitates with an alcohol-based washing solvent having a surface tension at 20±5° C. of 0.1 mN/m to 25 mN/m, for example, ethanol, and drying the washed metal oxide-silica composite precipitates in a temperature range of 90° C. to 200° C., wherein the silicate solution and the metal salt solution are used in amounts such that a molar ratio of water glass:metal ions is in a range of 1:1 to 3:1, and the metal salt includes $MgCl_2$ and $CaCl_2$ in amounts such that a molar ratio of magnesium ions to calcium ions is in a range of 1:2 to 2:1.

Since the shrinkage phenomenon of the silica gel, which occurs during the drying process, may be minimized by the above-described preparation process, a metal oxide-silica composite aerogel having low tap density, high specific surface area and porosity, and low thermal conductivity may be prepared.

Thus, according to another embodiment of the present invention, a metal oxide-silica composite aerogel prepared by the above-described preparation method is provided.

The metal oxide-silica composite aerogel is a composite in which the silica aerogel and the metal oxide are mixed in a composite aerogel structure, wherein it has low tap density, high specific surface area and porosity, and low thermal conductivity by controlling conditions during the preparation process.

Specifically, the metal oxide-silica composite aerogel has a tap density of 0.41 g/ml or less or 0.048 g/ml to 0.41 g/ml, particularly 0.048 g/ml to 0.1 g/ml, and more particularly 0.048 g/ml to 0.05 g/ml. In this case, the tap density of the metal oxide-silica composite aerogel may be measured using a tap density tester (TAP-2S, Logan Instruments Co.).

Also, in addition to the above-described tap density, the metal oxide-silica composite aerogel may have a BET specific surface area of 400 $m^2/g$ or more or 400 $m^2/g$ to 600 $m^2/g$, for example, 400 $m^2/g$ to 520 $m^2/g$. In the present invention, the specific surface area of the metal oxide-silica composite aerogel may be measured based on the amounts of nitrogen, which are adsorbed and desorbed according to partial pressure ($0.11<p/p_o<1$), using a Micromeritics ASAP 2010 analyzer.

Furthermore, the metal oxide-silica composite aerogel may have an average particle diameter ($D_{50}$) of 7 μm to 15 μm, for example, 7 μm to 12 μm. In the present invention, the average particle diameter ($D_{50}$) of the metal oxide-silica composite aerogel may be defined as a particle diameter at 50% in a cumulative particle diameter distribution. In this case, the average particle diameter of the metal oxide-silica composite aerogel may be measured by using a laser diffraction method, or the average particle diameter ($D_{50}$) at 50% in a cumulative particle diameter distribution of the measurement instrument may be calculated by using a particle size measurement instrument (Macrotrac Particle Size Analyzer S3500) as a dry analysis model.

Also, the metal oxide-silica composite aerogel may have a pore volume of 0.4 $cm^3/g$ to 1.0 $cm^3/g$, particularly 0.5 $cm^3/g$ to 0.98 $cm^3/g$, and more particularly 0.9 $cm^3/g$ to 0.98 $cm^3/g$. In this case, the pore volume of the metal oxide-silica composite aerogel may be determined from an amount of mercury intruded into pores which is measured by mercury porosimetry analysis.

Furthermore, the metal oxide-silica composite aerogel may have a porosity of 80 vol % or more, or 90 vol % to 98 vol %, and may include micropores having an average pore diameter of 20 nm or less, or 5 nm to 15 nm. In this case, the average pore diameter and the porosity of the metal oxide-silica composite aerogel may be measured based on the amounts of nitrogen, which are adsorbed and desorbed according to partial pressure ($0.11<p/p_o<1$), using a Micromeritics ASAP 2010 analyzer.

Also, low thermal conductivity and improved heat insulation effect may be obtained due to the above-described tap density, specific surface area, particle diameter, and pore volume. Specifically, the metal oxide-silica composite aerogel may have a thermal conductivity of 30 mW/mK or less. In this case, the thermal conductivity may be measured at 25° C. using a thermal conductivity meter (HFM436 Lambda, NETZSCH).

In the metal oxide-silica composite aerogel, the silica aerogel has a porous particulate structure including a plurality of micropores, wherein it may include a microstructure, in which nano-sized primary particles, particularly, primary particles having an average particle diameter ($D_{50}$) of 100 nm or less, or 1 nm to 50 nm, are combined to form a cluster in the form of a mesh, i.e., a three-dimensional network structure.

Furthermore, since the metal oxide is immobilized by a silanol group present on a surface of the silica aerogel, it is describable to appropriately control density of the silanol group present on the surface of the silica aerogel in order to increase an immobilization efficiency between a negative charge of the surface of the silica aerogel and a positive charge of the metal oxide. Specifically, the density of the silanol group present on the surface of the silica aerogel may be 10/nm$^2$ or less, or 5/nm$^2$ to 7/nm$^2$.

Accordingly, the silica aerogel may have a BET specific surface area of 50 m$^2$/g to 700 m$^2$/g, an average particle diameter ($D_{50}$) of 10 μm to 150 μm, a porosity of 0.5 cm$^3$/g to 2.4 cm$^3$/g, and an average pore diameter of the pores included in the silica aerogel of 0.5 nm to 40 nm. In a case in which the BET specific surface area, average particle diameter, porosity, or average pore diameter is outside the above range, for example, the average pore diameter is less than 0.5 nm, since the density of the silanol group is relatively increased, an absolute value of the negative charge is increased, and, as a result, the immobilization efficiency with respect to the positively charged metal oxide is increased, but hydrophilicity is also increased to reduce dispersibility of the metal oxide-silica composite aerogel. Also, in a case in which the average pore diameter is greater than 40 nm, since the density of the silanol group is relatively decreased, there is no concern that the dispersibility of the metal oxide-silica composite aerogel is reduced, but the immobilization efficiency may be reduced due to the low absolute value of the negative charge.

In the metal oxide-silica composite aerogel, the metal oxide may be used without particular limitation as long as it is used to form the composite aerogel by being immobilized by the silanol group on the surface of the silica aerogel. Specifically, the metal oxide may be an oxide including at least one metal selected from the group consisting of alkali metals, alkaline earth metals, lanthanides, actinides, transition metals, and Group 13 (IIIA) metals, may particularly be an oxide including at least one metallic element selected from the group consisting of calcium (Ca), magnesium (Mg), copper (Cu), zinc (Zn), manganese (Mn), cadmium (Cd), lead (Pb), nickel (Ni), chromium (Cr), silver (Ag), titanium (Ti), vanadium (V), cobalt (Co), molybdenum (Mo), tin (Sn), antimony (Sb), strontium (Sr), barium (Ba), and tungsten (W), and may more particularly be magnesium oxide, calcium oxide, or a mixture thereof.

The metal oxide is discontinuously physically immobilized on the surface of the silica by electrical attraction between the relatively positively charged metal oxide and the negative charge due to the silanol group present on the surface of the silica. Accordingly, in order for the metal oxide to be immobilized on the surface of the silica aerogel easily and with excellent efficiency and simultaneously exhibit a sufficient effect, the metal oxide may have appropriate particle diameter and specific surface area. Specifically, the metal oxide may have a specific surface area of 20 m$^2$/g to 100 m$^2$/g and an average particle diameter of 5 nm to 300 nm.

Also, an amount of the metal oxide included in the composite aerogel may be adjusted depending on the application of the metal oxide-silica composite aerogel, but, specifically, the metal oxide may be included in an amount of 5 wt % to 80 wt % based on a total weight of the composite aerogel. Furthermore, the metal oxide may be included in an amount such that a molar ratio (molar ratio of Si/Me) of silicon (Si) included in the metal oxide-silica composite aerogel to metal (Me) included in the metal oxide is 1:1 to 3:1, particularly 1.5:1 to 3:1, and more particularly 3:1.

Specifically, according to another embodiment of the present invention, a metal oxide-silica composite aerogel having an average particle diameter ($D_{50}$) of 7 μm to 15 μm, for example, 7 μm to 12 μm, a tap density of 0.41 g/ml or less, for example, 0.048 g/ml to 0.41 g/ml, a specific surface area of 400 m$^2$/g or more, for example, 400 m$^2$/g to 600 m$^2$/g, and a pore volume of 0.4 cm$^3$/g to 1.0 cm$^3$/g, for example, 0.4 cm$^3$/g to 0.98 cm$^3$/g is provided by controlling the pH of the mixed liquid of the silicate solution and the metal salt solution to be in a range of 3 to 9.5 and simultaneously controlling the surface tension of the washing solvent within the above-described range during the preparation.

Also, specifically, according to another embodiment of the present invention, a metal oxide-silica composite aerogel having an average particle diameter ($D_{50}$) of 7 μm to 15 μm, for example, 7 μm to 12 μm, a tap density of 0.048 g/ml to 0.1 g/ml, a specific surface area of 400 m$^2$/g to 520 m$^2$/g, and a pore volume of 0.90 cm$^3$/g to 0.98 cm$^3$/g, which includes a silica aerogel and a metal oxide, wherein the metal oxide includes magnesium oxide and calcium oxide in amounts such that a molar ratio of magnesium to calcium is in a range of 1:2 to 2:1, is provided by a preparation process configured by optimally combining the concentration of the water glass, the concentration of the metal ions in the silicate solution, the pH range of the mixture, the molar ratio of the water glass to the metal ions, and the molar ratio of magnesium ions to calcium ions in the metal salt, particularly, by controlling the pH of the mixed liquid of the silicate solution and the metal salt solution to be in a range of 5 or more to less than 7 and simultaneously controlling the surface tension of the washing solvent within the above-described range.

As described above, since the metal oxide-silica composite aerogel prepared by the preparation method according to the present invention has excellent physical properties such as low tap density and high specific surface area, the metal oxide-silica composite aerogel is suitable for a catalyst, or heat insulation materials, lagging materials, or non-flammable materials of aircrafts, ships, automobiles, and building structures as well as plant facilities for insulation such as an industrial furnace or pipes of various industrial equipment.

Hereinafter, the present invention will be described in more detail, according to the following examples and experimental example. However, the following examples and experimental example are merely presented to exemplify the present invention, and the scope of the present invention is not limited thereto.

Example 1-1

Distilled water was added and mixed with water glass (Na$_2$SiO$_3$) to prepare a 1.5 M silicate solution. Separately, MgCl$_2$ and CaCl$_2$ were dissolved in distilled water until a metal concentration became 0.5 M to prepare a metal salt solution (molar ratio of Mg$^{2+}$:Ca$^{2+}$=2:1), and the metal salt solution was then added and mixed with the silicate solution (pH of the mixture=9.5). White precipitates were generated immediately when a reaction of the silicate solution with the metal salt solution occurred.

After natural precipitation of the precipitates, a transparent solvent on an upper layer was separated and removed. The separated precipitates were repeatedly washed three times with ethanol. Thereafter, the washed precipitates were vacuum filtered, and a generated cake (water content of about 85 wt %) was disposed in an oven and then dried at a temperature of 105° C. to prepare a metal oxide-silica composite aerogel. In this case, amount and treatment condition of each compound used were as described in the following Table 1.

Examples 1-2 to 6-3; and Comparative Examples 1 to 6

Metal oxide-silica composite aerogels were prepared in the same manner as in Example 1-1 except that the preparation of each metal oxide-silica composite aerogel was performed under conditions described in the following Tables and 2. However, with respect to Examples 2-1 to 3-3, Examples 5-1 to 6-3, and Comparative Examples 2, 3, 5, and 6, after the mixing of the metal salt solution with the silicate solution, a pH of the mixed liquid was controlled to values listed the following Tables 1 and 2 by adding HCl as an acid catalyst.

Example 7

A metal oxide-silica composite aerogel was prepared in the same manner as in Example 1-1 except that the precipitates were washed once using ethanol and were then additionally washed using hexane during the washing of the precipitates.

Experimental Example

A change in tap density of each metal oxide-silica composite aerogel according to changes in preparation conditions during the preparation of the metal oxide-silica composite aerogels of Examples 1-1 to 6-3 and Comparative Examples 1 to 6 was evaluated.

Specifically, after tapping the metal oxide-silica composite aerogels prepared in Examples 1-1 to 6-3 and Comparative Examples 1 to 6 2,500 times, tap densities were respectively measured using a jolting volumeter type STAV II, and improvement efficiency was evaluated by expressing a reduced degree of the tap density as a percentage, base on a tap density when using water as the washing solvent under the same preparation conditions (based on Comparative Example). The results thereof are presented in Tables 1 and 2 below.

TABLE 1

| | Silicate solution | Metal salt solution | | | Composite | | |
|---|---|---|---|---|---|---|---|
| | $Na_2SiO_3$ concentration (M) | Metal concentration (M) | $Mg^{2+}:Ca^{2+}$ molar ratio | Mixed liquid pH | Washing solvent | aerogel tap density (g/ml) | Improvement efficiency (%) |
| Comparative Example 1 | 1.5 | 0.5 | 2:1 | 9.5 | Distilled water | 0.284 | — |
| Example 1-1 | | | | | Ethanol | 0.112 | 60.6 |
| Example 1-2 | | | | | Mixed liquid of water and ethanol (volume ratio of 60:40) | 0.145 | 48.9 |
| Example 1-3 | | | | | Hexane | 0.129 | 54.6 |
| Comparative Example 2 | 1.5 | 0.5 | 2:1 | 6.2 | Distilled water | 0.134 | — |
| Example 2-1 | | | | | Ethanol | 0.065 | 51.5 |
| Example 2-2 | | | | | Mixed liquid of water and ethanol (volume ratio of 60:40) | 0.099 | 26.1 |
| Example 2-3 | | | | | Hexane | 0.074 | 44.8 |
| Comparative Example 3 | 1.5 | 0.5 | 2:1 | 3.1 | Distilled water | 0.153 | — |
| Example 3-1 | | | | | Ethanol | 0.078 | 52.7 |
| Example 3-2 | | | | | Mixed liquid of water and ethanol (volume ratio of 60:40) | 0.105 | 36.4 |
| Example 3-3 | | | | | Hexane | 0.084 | 49.1 |

TABLE 2

| | Silicate solution | Metal salt solution | | | | Composite | |
|---|---|---|---|---|---|---|---|
| | $Na_2SiO_3$ concentration (M) | Metal concentration (M) | $Mg^{2+}:Ca^{2+}$ molar ratio | Mixed liquid pH | Washing solvent | aerogel tap density (g/ml) | Improvement efficiency (%) |
| Comparative Example 4 | 0.75 | 0.25 | 2:1 | 9.3 | Distilled water | 0.421 | — |
| Example 4-1 | | | | | Ethanol | 0.153 | 63.7 |
| Example 4-2 | | | | | Mixed liquid of water and ethanol (volume ratio of 60:40) | 0.194 | 53.9 |
| Example 4-3 | | | | | Hexane | 0.172 | 59.1 |
| Comparative Example 5 | 0.75 | 0.25 | 2:1 | 5.9 | Distilled water | 0.224 | — |
| Example 5-1 | | | | | Ethanol | 0.048 | 78.6 |
| Example 5-2 | | | | | Mixed liquid of water and ethanol (volume ratio of 60:40) | 0.086 | 61.6 |
| Example 5-3 | | | | | Hexane | 0.068 | 69.6 |
| Comparative Example 6 | 0.75 | 0.25 | 2:1 | 3.0 | Distilled water | 0.251 | — |
| Example 6-1 | | | | | Ethanol | 0.061 | 75.7 |
| Example 6-2 | | | | | Mixed liquid of water and ethanol (volume ratio of 60:40) | 0.112 | 55.4 |
| Example 6-3 | | | | | Hexane | 0.088 | 64.9 |

Surface tensions of the washing solvents used are presented in Table 3 below.

TABLE 3

| Washing solvent | Temperature (° C.) | Surface tension (mN/m) |
|---|---|---|
| Water | 25 | 71.97 |
| Ethanol | 20 | 22.27 |
| Mixed liquid of water and ethanol (volume ratio of 60:40) | 25 | 22.63 |
| Hexane | 20 | 18.4 |

As illustrated in Tables 1 to 3, the metal oxide-silica composite aerogels of Examples 1-1 to 6-3 prepared using the washing solvents having a low surface tension had reduced tap densities in comparison to Comparative Examples 1 to 6 which were prepared by only changing the washing solvent to water under the same preparation conditions, and a degree of improvement was in a range of 45% or more to a maximum of 69%. From these results, it may be understood that the tap density of the finally prepared composite aerogel may be significantly improved only by the control of the surface tension of the washing solvent.

In Examples 1-1 to 6-3, in a case in which the mixed solvent of ethanol and hexane was used, an effect of improving the tap density of the metal oxide-silica composite aerogel was somewhat low in comparison to a case where ethanol was used alone. These results were obtained due to the fact that the water in the metal oxide-silica composite aerogel particles was not dispersed into the hexane in the washing solvent, but was mixed only with the ethanol and, as a result, during drying, the hexane was first dried by being exposed to a surface layer and the ethanol was then dried to reduce drying efficiency. From these results, it may be understood that a better effect of improving the tap density of the finally prepared composite aerogel may be obtained by the use of the washing solvent having miscibility with water, that is, hydrophilicity, in addition to the control of the surface tension.

Also, average particle diameter ($D_{50}$), BET specific surface area, and pore volume were respectively measured for the metal oxide-silica composite aerogels of Examples 2-1 and 5-1 and Comparative Example 1.

Specifically, with respect to the average particle diameter ($D_{50}$) of the metal oxide-silica composite aerogel, the average particle diameter ($D_{50}$) at 50% in a cumulative particle diameter distribution of the measurement instrument was calculated by using a particle size measurement instrument (Macrotrac Particle Size Analyzer S3500) as a dry analysis model. After a particle diameter was measured three times, the average particle diameter ($D_{50}$) was expressed as an average value.

Also, a BET specific surface area was measured by a 6-point BET method according to a nitrogen gas adsorption-flow method using a porosimetry analyzer (Belsorp-II mini by Bell Japan Inc.).

Furthermore, with respect to a pore volume, an amount of mercury intruded into pores was measured by mercury porosimetry analysis, and the pore volume was determined therefrom. The results thereof are presented in Table 4 below.

TABLE 4

| | Tap density (g/ml) | Average particle diameter ($D_{50}$) (μm) | BET specific surface area ($m^2/g$) | Pore volume ($cm^3/g$) |
|---|---|---|---|---|
| Comparative Example 1 | 0.284 | 13.3 | 100 | 0.20 |
| Example 2-1 | 0.065 | 9.2 | 480 | 0.92 |
| Example 5-1 | 0.048 | 8.4 | 520 | 0.98 |

According to the measurement results, the metal oxide-silica composite aerogels of Examples 2-1 and 5-1 prepared by using the washing solvent having optimized surface tension had significantly higher BET specific surface area and pore volume despite the fact that the metal oxide-silica composite aerogels of Examples 2-1 and 5-1 had a similar level of particle diameter in comparison to the composite aerogel of Comparative Example 1. From these results, it may be understood that the physical properties, BET specific surface area, and pore properties of the metal oxide-silica composite aerogel may be improved by the control of the surface tension of the washing solvent.

The invention claimed is:

1. A method of preparing a metal oxide-silica composite aerogel, the method comprising:
    preparing metal oxide-silica composite precipitates by adding a metal salt solution having a metal ion concentration of 0.125 M to 0.5 M to a silicate solution to form a mixed liquid and performing a reaction while controlling the pH of the mixed liquid to be in a range of 3 to 9.5 by adding an acid catalyst, to yield the metal oxide-silica composite precipitates in a liquid;
    separating the metal oxide-silica composite precipitates from the liquid;
    washing to remove unreacted reactants remaining in the metal oxide-silica composite precipitates using a washing solvent having a surface tension at 20±5° C. of 30 mN/m or less; and
    drying the washed metal oxide-silica composite precipitates,
    wherein the washing solvent comprises at least one compound selected from the group consisting of an alcohol-based compound, a hydrocarbon-based compound, and a ketone-based compound.

2. The method of claim 1, wherein the washing solvent has a surface tension at 20±5° C. of 0.1 mN/m to 25 mN/m.

3. The method of claim 1, wherein the washing solvent comprises ethanol.

4. The method of claim 1, wherein the washing is performed in multiple stages including a primary washing process with ethanol; and a secondary washing process with a washing solvent including one selected from the group consisting of methanol, tetrahydrofuran, toluene, and hexane, or a mixture of two or more thereof.

5. The method of claim 1, wherein the silicate solution is prepared by dissolving water glass at a concentration of 0.125 M to 3.0 M.

6. The method of claim 1, wherein the metal salt comprises chloride including at least one metal selected from the group consisting of alkali metals, alkaline earth metals, lanthanides, actinides, transition metals, and Group 13 (IIIA) metals.

7. The method of claim 1, wherein the metal salt comprises one selected from the group consisting of $MgCl_2$ and $CaCl_2$), or a mixture thereof.

8. The method of claim 1, wherein the metal salt comprises $MgCl_2$ and $CaCl_2$) in amounts such that a molar ratio of magnesium ions to calcium ions is in a range of 1:2 to 2:1.

9. The method of claim 1, wherein the reaction of the silicate solution with the metal salt solution is performed in a pH range of 3 to 9.5.

10. The method of claim 1, wherein the reaction is performed in a pH range of 3 to 9 by further adding an acid catalyst during the reaction of the silicate solution with the metal salt solution.

11. The method of claim 10, wherein the acid catalyst comprises hydrochloric acid.

12. The method of claim 1, wherein the drying is performed in a temperature range of 90° C. to 200° C.

13. A metal oxide-silica composite aerogel prepared by the method of claim 1.

14. The metal oxide-silica composite aerogel of claim 13, wherein the metal oxide-silica composite aerogel has a tap density of 0.048 g/ml to 0.41 g/ml and a Brunauer-Emmett-Teller (BET) specific surface area of 400 $m^2/g$ to 520 $m^2/g$.

15. The metal oxide-silica composite aerogel of claim 14, wherein the metal oxide-silica composite aerogel has an average particle diameter ($D_{50}$) of 7 μm to 15 μm and a pore volume of 0.4 $cm^3/g$ to 1.0 $cm^3/g$.

* * * * *